United States Patent [19]

Melgoza

[11] Patent Number: 4,622,906
[45] Date of Patent: Nov. 18, 1986

[54] ONION PLANTER

[76] Inventor: Raymond Melgoza, P.O. Box 443, Coalinga, Calif. 93210

[21] Appl. No.: 662,782

[22] Filed: Oct. 19, 1984

Related U.S. Application Data

[63] Continuation-in-part of Ser. No. 534,668, Sep. 22, 1983, Pat. No. 4,478,159, which is a continuation of Ser. No. 305,956, Sep. 28, 1981, abandoned.

[51] Int. Cl.$^4$ .................................................. A01C 5/00
[52] U.S. Cl. ........................................ 111/84; 111/87; 172/551; 172/573
[58] Field of Search ............... 111/52, 69, 77, 84–88, 111/53–59; 172/551, 572, 573

[56] References Cited

U.S. PATENT DOCUMENTS

| 433,036 | 7/1890 | Rhodes | 111/84 |
|---|---|---|---|
| 1,415,674 | 5/1922 | Mitchell | 111/85 X |
| 1,642,908 | 9/1927 | Taylor | 111/87 X |
| 2,429,841 | 10/1947 | Phillips | 111/87 X |
| 2,551,475 | 5/1951 | Turner | 172/573 |
| 3,611,956 | 10/1971 | Moore | 111/87 |
| 3,851,802 | 12/1974 | Marshall | 111/77 |
| 4,078,504 | 3/1978 | Tye | 111/85 X |
| 4,194,575 | 3/1980 | Whalen | 172/551 |
| 4,466,492 | 8/1984 | Steinberg | 172/711 |

FOREIGN PATENT DOCUMENTS

| 75754 | 6/1894 | Fed. Rep. of Germany | 111/88 |
|---|---|---|---|
| 224409 | 7/1910 | Fed. Rep. of Germany | 111/87 |
| 18240 | 2/1914 | France | 111/88 |
| 51899 | 2/1919 | Sweden | 111/69 |
| 898698 | 6/1962 | United Kingdom | 111/88 |

Primary Examiner—James R. Feyrer
Attorney, Agent, or Firm—Matthew L. Ajeman

[57] ABSTRACT

Planter apparatus (10) including a plurality of pivotally mounted arms (22, 24) each having a disc unit (26) arranged on an outboard end thereof has each of the arms constructed with horizontal and angular portions (28, 30 and 32, 34) disposed at such an angle with respect to one another that the horizontal portion experiences greatly reduced side forces. The lighter construction of the arms thus afforded permits inclusion of a fine adjustment in the resilient control arrangement (58) associated with each of the arms, with this fine adjustment preferably being obtained by use of torsion springs (62) associated with each of the arms. A stop assembly (48) is provided inboard of the pivot point of each of the arms for potential abutment with an associated subframe (16) of the apparatus in order to limit downward swinging movement of an associated disc unit in the event of disengagement or other failure of the primary motion control system of the arms.

18 Claims, 3 Drawing Figures

U.S. Patent  Nov. 18, 1986  4,622,906
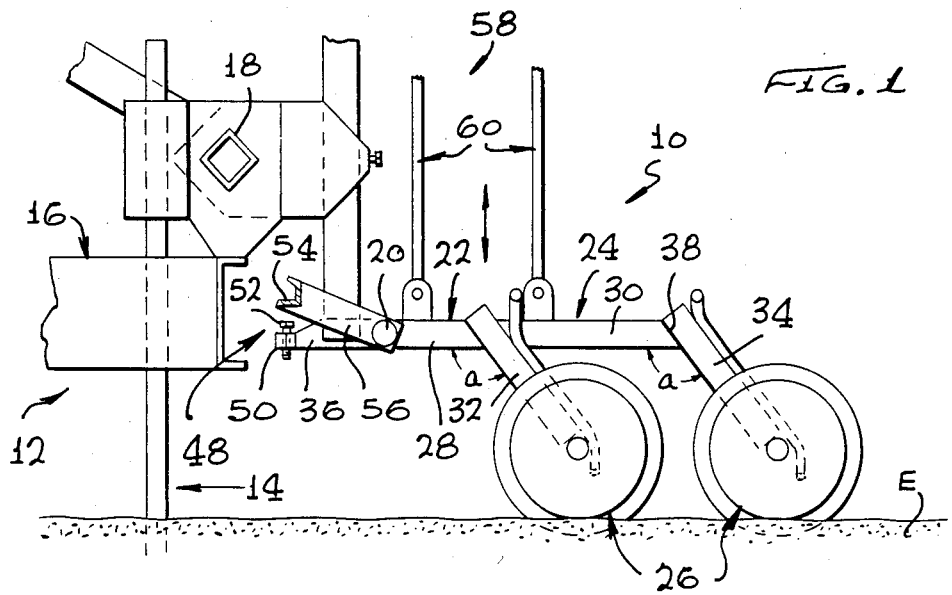
FIG. 1
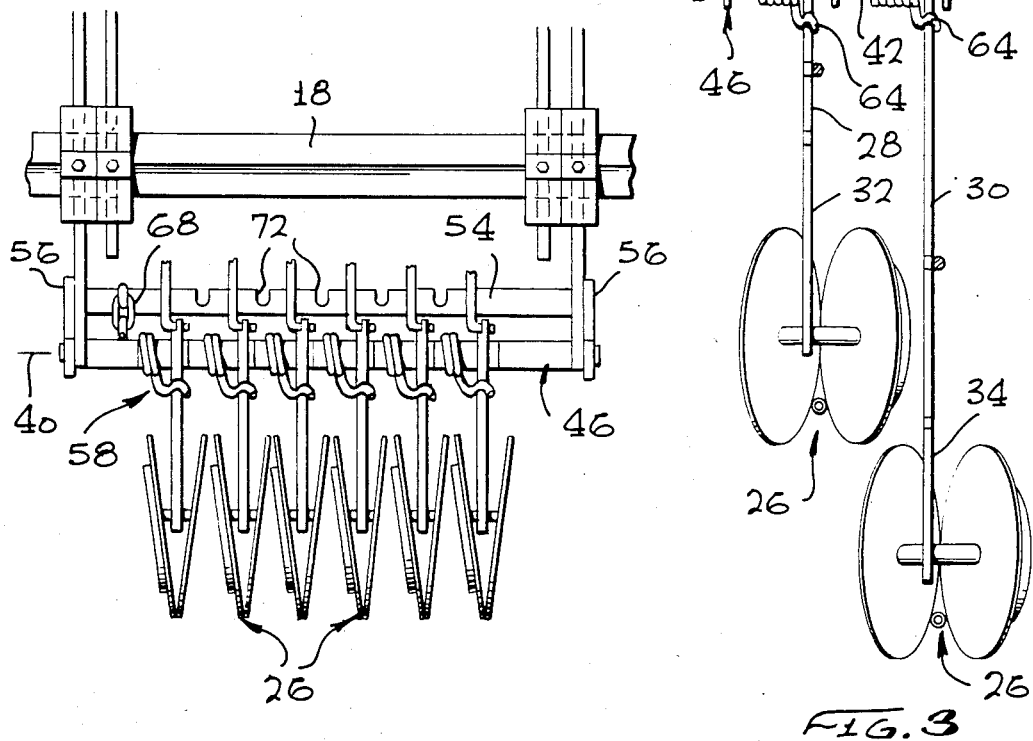
FIG. 2
FIG. 3

ONION PLANTER

CROSS-REFERENCE TO RELATED APPLICATIONS

This application is a contination-in-part of my prior, co-pending, U.S. application for patent, Ser. No. 534,668, filed Sept. 22, 1983, now U.S. Pat. No. 4,478,159, issued Oct. 23, 1984, and itself a continuation of U.S. application for patent, Ser. No. 305,956, filed Sept. 28, 1981, and entitled "Apparatus For Planting Seeds And The Like" and now abandoned.

BACKGROUND OF THE INVENTION

1. Field of the Invention

This application relates generally to apparatus for planting onion seeds, and the like, and more particularly to improvements in the construction and mounting of disc-carrying arms employed with onion planters and similar devices.

2. Description of the Prior Art

My co-pending U.S. application for patent, Ser. No. 534,668, a continuation of abandoned U.S. application Ser. No. 305,946 and now U.S. Pat. No. 4,478,159, is directed to apparatus for planting seeds, and the like, wherein a plurality of planter-disc carrying arms are pivotally mounted on a frame of the apparatus so as to permit the discs to pass over debris and other obstructions lying in the path of the planter apparatus. The construction of these arms includes a generally longitudinally extending portion pivotally mounted on an associated subframe and terminating in a generally perpendicular leg spaced from the associated subframe and on which is journaled a set of planter discs. A problem has been encountered with this construction, however, inasmuch as side forces exerted on the generally longitudinally extending portion of the arm require that portion to be strongly braced against buckling. Solutions to this problem have ranged from the provision of an elongated piece of bracing material welded or otherwise attached to a side of the longitudinally extending portion of each arm, to the construction of the longitudinally extending portion of each of the arms as a hollow tube having a rectangular cross-section. In general, however, these solutions increase the weight of the arm, and thus the force required to lift the arm over obstacles encountered as the planter traverses a field, and accordingly none has been entirely satisfactory.

Another problem encountered with the use of planter apparatus constructed in accordance with that disclosed in my prior, co-pending, U.S. application for patent, Ser. No. 534,668, now U.S. Pat. No. 4,478,156 is that on occasion a spring-biased rod normally extending vertically above each of the disc-carrying arms of the planter becomes disengaged, permitting the associated planter arm to drop down more than a predetermined distance relative to the soil being worked, with resulting damage to the seed dispensing hoses, and the like, of the planter assembly. In addition, although the aforementioned spring-biased rod provides a satisfactory control for the planter arms when a heavy soil is being worked, it has been found that the adjustment provided by such a spring arrangement is often unsatisfactory when a light soil is being planted.

SUMMARY OF THE INVENTION

It is an object of the present invention to provide a planter-arm construction having reduced side-loading when compared to known arm constructions for the same or a similar purpose.

It is another object of the present invention to provide a mounting assembly for disc-carrying planter-arms, and the like, which will prevent the arm from falling below a predetermined level if the normal constraints on the arm fail for any reason.

Still another object of the present invention is to provide a mounting for disc-carrying planter-arms wherein a bias on a particular arm can be finely-adjusted for use with light soils, and the like.

These and other objects are achieved according to the present invention by providing an arm construction for onion planters, and the like, having a horizontal or generally longitudinally extending portion pivotally mounted on a subframe of the planter apparatus and terminating in spaced relation to the subframe of the apparatus in an angular portion arranged carrying a set of planter discs, and the like, and disposed with respect to the longitudinally extending portion of the arm at an angle which is greater than 90°, but less than 180°. Preferably, the angle between the horizontal portion and the angular portion is in the range of 105° to 115°. The arm itself is journaled on the associated subframe at a pivot point disposed between the end thereof on which the angular portion is mounted and another end which cooperates with an abutment provided on the subframe to form an emergency stop which prevents downward swing of the planter disc below a certain predetermined level in the event the primary motion control on the arm becomes disengaged or otherwise rendered inoperative. In addition, a torsion spring is provided on the arm at the pivot point thereof in order to provide a fine adjustment for controlling movement of the associated planter arm when same is to be used in light soils, and the like.

It is an advantage of the present invention that the construction of the disc-carrying arms thereof reduces side forces on the arms, permitting the arms to be of light weight and unbraced construction.

It is another advantage of the present invention that a downward swing of the planter-disc carried by each arm of the apparatus is limited by a stop mechanism so as to prevent damage to the planter assembly in the event of a malfunction of the primary motion control system of the apparatus.

Still another advantage of the present invention is that a bias on each of the disc-carrying arms of the apparatus can be fine adjusted for use with light soils, and the like.

BRIEF DESCRIPTION OF THE DRAWINGS

FIG. 1 is a diagrammatic, fragmentary, side elevational view, partially broken away and in section, showing the improved disc-carrying arm construction and mounting arrangement in accordance with the present invention.

FIG. 2 is a diagrammatic, fragmentary, front elevational view showing the arrangement of FIG. 1.

FIG. 3 is a diagrammatic, fragmentary, top plan view, showing the arrangement of FIGS. 1 and 2.

DESCRIPTION OF THE PREFERRED EMBODIMENTS

Referring now more particularly to FIGS. 1 through 3 of the drawings, apparatus 10 for simultaneously planting seeds in a plurality of adjacent beds of earth E separated by substantially parallel furrows (not shown) includes a mainframe 12 mountable on a vehicle (not shown) such as a conventional tractor, and the like, for movement with the vehicle over beds of Earth disposed along a path in a predetermined direction of travel 14 which is substantially parallel to furrows associated with the beds of earth E. A subframe 16 mounted on mainframe 12 as by a conventional tool bar 18, and the like, has an axle 20 arranged oriented substantially horizontal with respect to a plane of earth E and transversely of the predetermined direction of travel 14. A plurality of sets of arms 22 and 24, with arms 24 being of a length greater than a length of the arms 22, are mounted on axle 20 of subframe 16 for independent pivotal movement about axle 20 in individual, spaced substantially parallel, planes disposed substantially normal to axle 20. Each of the arms 22, 24 carries a set of discs 26, of a construction known per se, disposed a predetermined distance from axle 20 of subframe 16 and having a substantially horizontal, longitudinally extending, portion 28 and 30, respectively, pivotally mounted on axle 20 of subframe 16, and an angular portion 30 and 32, respectively, extending from an associated portion 28, 30 in spaced relation to subframe 16. While the angle between a portion 38, 30 and an angular portion 32, 34 conceivably can vary greater than 90° to less than 180°, an angle in the range of 105° to 115° has been found to greatly reduce the side forces on the associated horizontal portion 28, 30 of an associated arm 22, 24, with an included angle a of about 110° being optimum when both performance and appearance are considered.

The portion 28, 30 of each of the arms 22, 24 has a pair of spaced ends 36 and 38, and a pivot point 40 disposed between the spaced ends 36 and 38. An associated angular portion 32, 34 is disposed at an end 38, while each of the arms 22, 24 further includes a sleeve 42, preferably of the illustrated hollow, cylindrical configuration, affixed to the associated portion 28, 30 of the respective one of the arms 22, 24 at the pivot point 40 thereof and in spaced relation to an associated portion 30, 32 of the arm 22, 24 so as to be arrangeable on the axis 20 of subframe 16 for pivotal movement about the axle 20. Each of the arms 22, 24 has a predetermined depth at the pivot point 40 thereof, with a substantial semicircular recess 44 being provided in each of the arms 22, 24 at the pivot point 40 to a point at least one-half the predetermined depth thereof from a top to a bottom of the associated arm 22, 24, and a sleeve 42 disposed in the recess 44 and affixed to a respective one of the arms 22, 24 in a suitable manner, such as by welding. Preferably, each sleeve 42 is offset with respect to an associated one of the arms 22, 24, and more specifically, the horizontal portion 28, 30 of such arm, such that the sleeve 42 forms a seat for a torsion spring to be described below.

Advantageously, washers or other suitable spacer 46 can be placed on axle 20 between adjacent sleeves 42 for permitting arms 22, 24 to be disposed in varying distances from one another so as to permit, for example, salt ridge preservation, and the like, in a given field.

Disposed at end 36 of a respective one of the arms 22, 24 is a stop assembly 48 arranged for limiting movement of the arm 22, 24 by cooperating with a portion of subframe 16. More specifically, stop assembly 48 includes a nut 50 of conventional construction and having internal screw threads (not shown) affixed to end 36 of a respective one of the arms 22, 24. A bolt or other rod 52 having external screw threads adjustably, threadingly engaging in nut 50 provides an adjustment for the exact position in which the end 38 of the particular arm 22, 24 is stopped from downward movement by contact of bolt 52 with one leg of an L-shaped, or angular, abutment 54 mounted on subframe 16 in the path of bolt 52 for selective engagement by same. More specifically, a pair of cantilevers 56 are arranged extending from axle 20 on either side of the collection of arms 22, 24, and abutment 54 is arranged extending between such cantilevers 56 in a rigid manner.

Each of the arms 22, 24 also includes a resilient arrangement 58 for biasing the arms 22, 24 toward earth E being traversed. As disclosed in my co-pending U.S. application for patent, Ser. No. 534,668, filed Sept. 22, 1983, and a continuation of U.S. application for patent, Ser. No. 305,056, filed Sept. 28, 1981, the movement of each individual arm 22, 24 is controlled by an assembly 60 including an upwardly extending rod at the top of which is arranged a conventional compression spring, and the like, not shown. Details of the construction of this assembly 60 can be found in my aforementioned U.S. applications for patent, Ser. Nos. 305,956 now abandoned and 534,668, now U.S. Pat. No. 4,478,159 the disclosure of which are hereby incorporated by reference herein.

Resilient arrangement 58 also includes a conventional torsion spring 62 disposed on an associated sleeve 42 of each of the arms 22, 24, and arranged anchored to a respective one of the arms 22, 24 as by a one of a pair of hook ends 64 and to the subframe 16 for biasing the arm 22, 24 toward earth E being traversed. An adjustable anchor device 66 permits attachment of spring 62 to the subframe 16 in a manner to permit adjustment of tension of spring 62, and includes a chain 68 of generally conventional construction and a attached to the other of the terminal, hook ends 70 of a respective spring 62 and to subframe 16 by provision of a plurality of notches 72, one for each of the arms 22, 24, in the other of the legs of the L-shaped abutment 58 described above. By removably engaging the chain 68 within an associated notch 72, it will be appreciated that the tension on spring 62 can be increased or relaxed so as to provide a fine adjustment for each of the arms 22, 24.

As can be readily understood from the above description and from the drawing, construction of arms 22, 24 as disclosed herein will permit lighter construction of the horizontal portions 28, 30 thereof by reducing side forces on each of the arms. In this manner, arm construction for arrangement of the disc units 26 at a predetermined distance from axle 20, with distances of 20 and 32 inches being commonly used, lets a lighter arm 22, 24 to be employed, thus permitting greater responsiveness of the arms 22, 24 to the action of the resilient control arrangement 58, and particularly permitting inclusion of a fine adjustment feature as provided by torsion spring 62. Further, the provision of the stop assembly 48 provides a safety feature so that the disc units 26 are not damaged in the event of a disengagement or other failure of the primary control assemblies 60.

It is to be understood that the above description of the present invention is capable of various changes, modifications, and adaptions, and such are intended to be included within the meaning and range of equivalents of the following claims.

I claim:

1. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle mounted on the mainframe, the subframe arranged with the axle thereof being oriented substantially horizontally and transversely of the predetermined direction of travel, and a plurality of arms mounted on the axle of the subframe for independent pivotal movement about the axle in individual, spaced substantially parallel planes disposed substantially normal to the axle, each of the arms including a pair of spaced ends and a pivot point disposed between the spaced ends, a disc unit being mounted at the first of the ends of each of the arms; the improvement wherein adjustable stop means is disposed at the second of the ends of each of the arms for limiting movement of the respective arm by cooperating with the subframe, the stop means of the arm including a rod adjustably mounted at the second end of each arm and an abutment mounted on the subframe above and in the path of the rod for engagement by the rod.

2. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle mounted on the mainframe, the subframe being arranged with the axle thereof oriented substantially horizontally and transversely of the predetermined direction of travel, and a plurality of arms mounted on the axle for independent pivotal movement about the axle in individual, spaced substantially parallel planes disposed substantially normal to the axle, each of the arms carrying a disc unit, and resilient means associated with each of the arms for biasing the arms toward earth being traversed the improvement wherein the resilient means includes a torsion spring biasing the arm, said torsion spring arranged about the axle, the resilient means further including adjustable anchor means interconnecting said torsion spring and the subframe for permitting adjustment of tension on the associated torsion spring, the torsion of each arm can be adjusted independently of the torsion of the other of the arms.

3. An improvement as defined in claim 2, wherein each of the arms is journaled on the axle of the subframe by a sleeve offset with respect to the arm to form a seat for an associated torsion spring.

4. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle mounted on the mainframe, the subframe being arranged with the axle thereof oriented substantially horizontal and transversely of the predetermined direction of travel, and a plurality of arms mounted on the axle of the subframe for independent pivotal movement about the axle in individual, spaced, substantially parallel planes disposed substantially normal to the axle, each of the arms carrying a disc unit a predetermined distance from the axle of the subframe and having a substantially horizontal longitudinally extending, single rail portion pivotally mounted on the axle of the subframe, and an angular single rail portion extending cantilever-fashion from an end of the horizontal portion in spaced relation to the subframe, the disc unit being a pair of discs mounted for rotation on the angular portion in spaced relation to the horizontal portion, the improvement wherein the angular portion is at an angle in the range of about 105° to 115° with respect to a longitudinal extent of the horizontal portion.

5. An improvement as defined in claim 1, wherein the horizontal portion of at least one of the arms is of a length greater than a length of a horizontal portion of at least one of the remaining arms.

6. An improvement as defined in claim 1, wherein the angular portion is at an angle of about 110° with respect to the longitudinal extent of the horizontal portion.

7. An improvement as defined in claim 6, wherein the horizontal portion of at least one of the arms is of a length greater than a length of a horizontal portion of at least one of the other of the arms.

8. An improvement as defined in claim 7, wherein the horizontal portion of each of the arms has a pair of spaced ends and a pivot point disposed between the spaced ends, the angular portion being disposed at one end of the arm.

9. An improvement as defined in claim 8, where in each of the arms includes a sleeve affixed to the horizontal portion of the arm defining the pivot point, the sleeve being in spaced relation to the angular portion of the arm, the sleeve being pivotally mounted about the axle.

10. An improvement as defined in claim 9, further comprising stop means disposed at the other of the ends of a respective one of the arms for limiting movement of the one of the arms by cooperating with the subframe.

11. An improvement as defined in claim 9, wherein each of the arms includes resilient means for biasing the arm toward the earth.

12. An improvement as defined in claim 11, wherein the resilient means includes a torsion spring disposed about the sleeve of the arm and including anchor means, said anchor means connected to the arm for biasing the arm toward the earth.

13. An improvement as defined in claim 12, wherein the resilient means further includes adjustable tensioning means interconnecting the torsion spring to the subframe, said tensioning means including means for permitting adjustment of tension on the torsion spring.

14. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle and mounted on the mainframe, the subframe being arranged with the axle thereof oriented substantially horizontal and transversely of the predetermined direction of travel, and a plurality of arms mounted on the axle of the subframe for independent pivotal movement about the in individual, spaced, substantially parallel planes disposed substantially normal to the axle, each of the arms carrying a disc unit a predetermined distance from the axle and having a substantially horizontal, longitudinally extending, portion pivotally mounted on the axle, and an angular portion extending from the horizontal portion in spaced relation to the subframe, the improvement wherein the angular portion is at an angle of about 110° with respect to the longitudinal extent of the horizontal portion, the horizontal portion of at least one of the arms being of a length greater than the length of the horizontal portion of at least one of the remaining arms, the horizontal portion of each of the arms having a pair of spaced ends and a pivot point disposed between the spaced ends, the angular portion being disposed at one of the ends of the arm, each of the arms having a predetermined depth at the pivot point thereof, a substantially semicircular recess being provided at the pivot point, the recess extending to at least one-half the predetermined depth of the respective arm from the top to the bottom thereof, and the arm having an associated sleeve disposed in the recess and affixed to the arm.

15. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle mounted on the mainframe, the subframe being arranged with the axle thereof oriented substantially horizontal and transversely of the predetermined direction of travel, and a plurality of arms mounted on the axle for independent pivotal movement about the axle in individual, spaced, substantially parallel planes disposed substantially normal to the axle, each of the arms carrying a disc unit a predetermined distance from the axle and having a substantially horizontal, longitudinally extending, portion pivotally mounted on the axle, and an angular portion extending from the horizontal portion in spaced relation to the subframe, the improvement wherein the angular portion is at an angle of about 110° with respect to the longitudinal extent of the horizontal portion, the horizontal portion of at least one of the arms being of a length greater than a length of the horizontal portion of at least one of the remaining arms, the horizontal portion of each of the arms having a pair of spaced ends and a pivot point disposed between the spaced ends, the angular portion being disposed at one of the ends of the arm, each of the arms including a sleeve affixed to the horizontal portion of the arm at the pivot point thereof and in spaced relation to the angular portion of the arm, the sleeve being mounted on the axle for pivotal movement thereabout, stop means disposed at the end of the arm opposite the end having the angular portion, said stop means limiting movement of the arm by cooperating with the subframe, the stop means including a nut having internal screw threads and a rod having external screw threads adjustably, threadingly engaging in the nut, and an abutment mounted on a subframe in the path of the rod for engagement, whereby the attitude of the arm can be selectively adjusted.

16. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle mounted on the mainframe, the subframe being arranged with the axle thereof oriented substantially horizontal and transversely of the predetermined direction of travel, and a plurality of arms mounted on the axle of the subframe for independent pivotal movement about the axle in individual, spaced, substantially parallel planes disposed substantially normal to the axle, each of the arms carrying a disc unit a predetermined distance from the axle and having a substantially horizontal, longitudinally extending, portion pivotally mounted on the axle, and an angular portion extending from the horizontal portion in spaced relation to the subframe, the improvement wherein the angular portion is at an angle of about 110° with respect to the longitudinal extent of the horizontal portion, the horizontal portion of at least one of the arms being of a length greater than the length of the horizontal portion of at least one of the remaining arms, the horizontal portion of each of the arms having a pair of spaced ends and a pivot point disposed between the spaced ends, the angular portion being disposed at one of the ends of the arm, each of the arms including a sleeve affixed to the horizontal portion of the respective one of the arms at the pivot point thereof and in spaced relation to the angular portion of the arm, the sleeve being mounted on the axle for pivotal movement thereabout, each of the arms including resilient means for biasing the arm toward earth being traversed, the resilient means including a torsion spring, said torsion spring being disposed about the sleeve of the arm and anchored to the respective arm toward earth being traversed, the sleeve of each of the arms being offset with respect to the horizontal portion of the arm, the sleeve forming a seat for the torsion spring.

17. In apparatus for simultaneously planting seeds in a plurality of adjacent beds of earth separated by substantially parallel furrows, the apparatus including a mainframe mountable on a vehicle for movement with the vehicle over beds of earth disposed along a path in a predetermined direction of travel, a subframe having at least one axle mounted on the mainframe, the subframe being arranged with the axle thereof oriented substantially horizontal and transversely of the predetermined direction of travel, and a plurality of arms mounted on the axle of the subframe for independent pivotal movement about the axle of the subframe in individual, spaced, substantially parallel planes disposed substantially normal to the axle, each of the arms carrying a disc unit a predetermined distance from the axle and having a substantially horizontal, longitudinally extending, portion pivotally mounted on the axle, and an angular portion extending from the horizontal portion in spaced relation to the subframe, the improvement wherein the angular portion is at an angle of about 110° with respect to the longitudinal extent of the horizontal portion, the horizontal portion of at least one of the arms being of a length greater than a length of a horizontal portion of at least one of the remaining arms, the horizontal portion of each of the arms having a pair of spaced ends and a pivot point disposed between the spaced ends, the angular portion being disposed at one of the ends of the arm, each of the arms including a sleeve affixed to the horizontal portion of the arm at the pivot point thereof and in spaced relation to the angular portion of the respective arm the sleeve being arranged about the axle of the subframe for pivotal movement thereabout, each arm including resilient means for biasing a respective arm toward earth being traversed, the resilient means including a torsion spring disposed about the sleeve and anchored to the respective arm and to the subframe for biasing the respective arm toward earth being traversed, the resilient means further including adjustable anchor means attached between the torsion spring and the subframe for permitting adjustment of tension on the torsion spring, the torsion spring having a pair of terminal ends the first of the ends being attached to the respective arm, and the second of the ends including anchor means, the anchor means having a chain, the chain attached to the subframe, the subframe being provided with a plurality of notches, one said notch provided for each of the arms, with each of the notches being arranged for removeably receiving an associated chain, the respective chain being selectively engageable in an associated notch for tensioning an associated torsion spring for selective application of pressure to the respective arm.

18. An improvement as defined in claim 17, wherein the sleeve of each of the arms is offset with respect to the horizontal portion of the associated one of the arms, the sleeve being arranged forming a seat for the associated torsion spring.

* * * * *